(12) United States Patent
Zhang et al.

(10) Patent No.: US 9,555,562 B2
(45) Date of Patent: Jan. 31, 2017

(54) METHOD FOR MAKING NANO-SCALE FILM

(75) Inventors: Li-Na Zhang, Beijing (CN); Yao-Jun Zhang, Beijing (CN); Yi Ren, Beijing (CN); Kai-Li Jiang, Beijing (CN); Qun-Qing Li, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 1800 days.

(21) Appl. No.: 11/982,487

(22) Filed: Nov. 2, 2007

(65) Prior Publication Data
US 2008/0157435 A1 Jul. 3, 2008

(30) Foreign Application Priority Data
Dec. 27, 2006 (CN) .......................... 2006 1 0157992

(51) Int. Cl.
*B29C 41/12* (2006.01)
(52) U.S. Cl.
CPC ...................... *B29C 41/12* (2013.01)
(58) Field of Classification Search
CPC ..................................... B29C 41/12
USPC ......................................... 427/180
See application file for complete search history.

(56) References Cited

U.S. PATENT DOCUMENTS

| | | | | |
|---|---|---|---|---|
| 2,729,549 A | * | 1/1956 | Reman | B01D 11/0434 208/311 |
| 3,148,140 A | * | 9/1964 | Kaiser | C09C 1/487 210/634 |
| 4,728,576 A | * | 3/1988 | Gillberg-LaForce et al. | 428/411.1 |
| 2005/0181143 A1 | * | 8/2005 | Zhang et al. | 427/532 |
| 2005/0230874 A1 | | 10/2005 | Liu et al. | |

OTHER PUBLICATIONS

Luccio et al., Structural and morphological investigation of Langmuir-Blodgett SWCNT/behenic acid multilayers, Carbon, 42, p. 1119-1122, Jan. 25, 2004.*
CSGNetwork, Specific Gravity and Viscosity of Liquids, Website, Accessed: Jan. 13, 2010.*
Armitage, Quasi-Langmuir-Blodgett Thin Film Deposition of Carbon Nanotubes, arXiv: cond-mat, Jul. 29, 2003, p. 1-3.*
Armitage, Quasi-Langmuir-Blodgett thin film deposition of carbon nanotubes, Journal of Applied Physics 95, p. 3228-3230 (2004).*
Matsui, Simple Fabrication of Carbon Nanotube Monolayer Film, Chemistry Letters vol. 35, No. 1, p. 42-43 (2006).*
Determination of the Wettability of a solid by a Liquid, Industrial and Engineering Chemistry, vol. 19 No. 11, Nov. 1927, p. 1277-1280.*

* cited by examiner

*Primary Examiner* — Tabatha Penny
(74) *Attorney, Agent, or Firm* — Zhigang Ma

(57) ABSTRACT

A method for making a nano-scale film includes the steps of: (a) providing a suspension including an organic solvent and a number of nano-scale particles dispersed therein; (b) dropping/releasing the suspension into a liquid having a specific gravity greater than that of the nano-scale particles; and (c) forming a uniform film of nano-scale particles on the surface of the liquid.

14 Claims, 3 Drawing Sheets

METHOD FOR MAKING NANO-SCALE FILM

BACKGROUND

1. Field of the Invention

The invention relates to methods for making nano-scale films and, particularly, to a method for making a nano-scale film with nano-scale particles.

2. Discussion of Related Art

A nano-scale film is a film that is constituted of nano-scale particles or that is a nano-monolayer film or a nano-multi-layer film, which is in nanometer scale in thickness. Generally, the above-described film is also called a nano-particle film or a nano-multilayer film. As the nano-scale film has unique properties (e.g., optical, mechanical, electromagnetic, and/or sensitivity to gases and/or concentrations thereof), the nano-scale films have been widely applied in various fields, such as heavy industry, light industry, petrochemical, etc. Nano-scale films have been found especially useful in field emission electron sources, photoelectric and biological sensors, transparent electrical conductors, battery electrodes, absorbing materials, water purification materials, and related devices. Currently, conventional methods for making nano-scale films include a sol-gel method, a Langmuir-blodgett (L-B) method, electrochemical deposition, chemical vapor deposition, low energy cluster deposition, vacuum evaporation method, sputtering deposition method, molecular and atomic beam epitaxy, molecular self-assembly, etc. However, the above-described methods generally have complicated fabrication procedures. Thus, in use, such methods have proven less efficient than truly desirable. Furthermore, it is difficult to control the thickness of the nano-scale film in the above-described methods.

What is needed, therefore, is a method for making nano-scale film that is very simply and efficiently produced and whose thickness is easily controlled as a result of the production process.

SUMMARY

A method for making a nano-scale film includes the steps of: (a) providing a suspension including an organic solvent and a number of nano-scale particles dispersed therein; (b) dropping/releasing the suspension into a liquid having a specific gravity larger than that of the nano-scale particles; and (c) forming a uniform film of nano-scale particles on the surface of the liquid.

Other advantages and novel features of the present method for making a nano-scale film will become more apparent from the following detailed description of preferred embodiments when taken in conjunction with the accompanying drawings.

BRIEF DESCRIPTION OF THE DRAWINGS

Many aspects of the present method for making a nano-scale film can be better understood with reference to the following drawings. The components in the drawings are not necessarily to scale, the emphasis instead being placed upon clearly illustrating the principles of the present method for making a nano-scale film.

Figure 1:
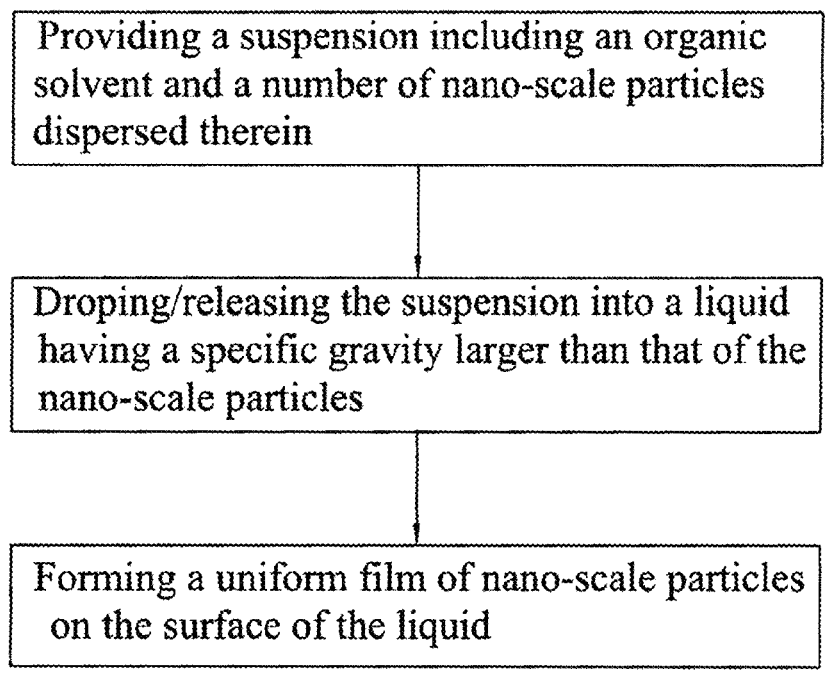
FIG. 1 is a schematic chart of a method for making a nano-scale film, in accordance with a present embodiment.

Corresponding reference characters indicate corresponding parts throughout the several views. The exemplifications set out herein illustrate at least one preferred embodiment of the present method for making a nano-scale film, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present method for making a nano-scale film, which includes a number of nano-sized particles and/or has a nano-sized thickness.

Referring to FIG. 1, a method for making a nano-scale film includes the steps of: (a) providing a suspension including an organic solvent and a number of nano-scale particles dispersed therein; (b) dropping/releasing the suspension into a liquid having a specific gravity larger/bigger than that of the nano-scale particles; and (c) forming a uniform film of nano-scale particles on the surface of the liquid.

In step (a), the organic solvent has a certain/particular solubility in ultrapure water. In addition, the organic solvent is soluble in the ultrapure water, has a lower density than pure water, and is a carrier of the nano-scale particles. That is, the organic solvent can infiltrate the nano-scale particles. The above-described organic solvent includes a substance selected from the group consisting of ethanol, acetone, methanol, isopropanol, ethyl acetate, and combinations thereof. The nano-scale particles can, advantageously, be carbon nanotubes and carbon black. Carbon nanotubes can be single-walled carbon nanotubes, double-walled carbon nanotubes, and/or multi-walled carbon nanotubes. Quite usefully, the average length of the carbon nanotubes is approximately in the range from a few micrometers/microns to tens of micrometers (e.g., 1~50 em). A process of preparing the nano-scale particle suspension includes the sub-steps of: (a1) mixing a certain amount of nano-scale particles into the organic solvent to form a mixture; and (a2) ultrasonically vibrating the mixture for at least about five minutes, in order to form the suspension with nano-scale particles uniformly dispersed therein.

In step (b), specifically, the liquid in which the suspension is dropped or otherwise placed/deposited must have a specific gravity (i.e., density) larger/greater than that of the nano-scale particles and must not be fully saturated/loaded with the nano-scale particles. That is, the liquid does not infiltrate the nano-scale particles. As such, the liquid can, e.g., be the ultrapure water or a solution of the ultrapure water and a salt, with the chosen liquid having the necessary density and the ability to diffuse/dissolve with the organic solvent.

Figure 2:
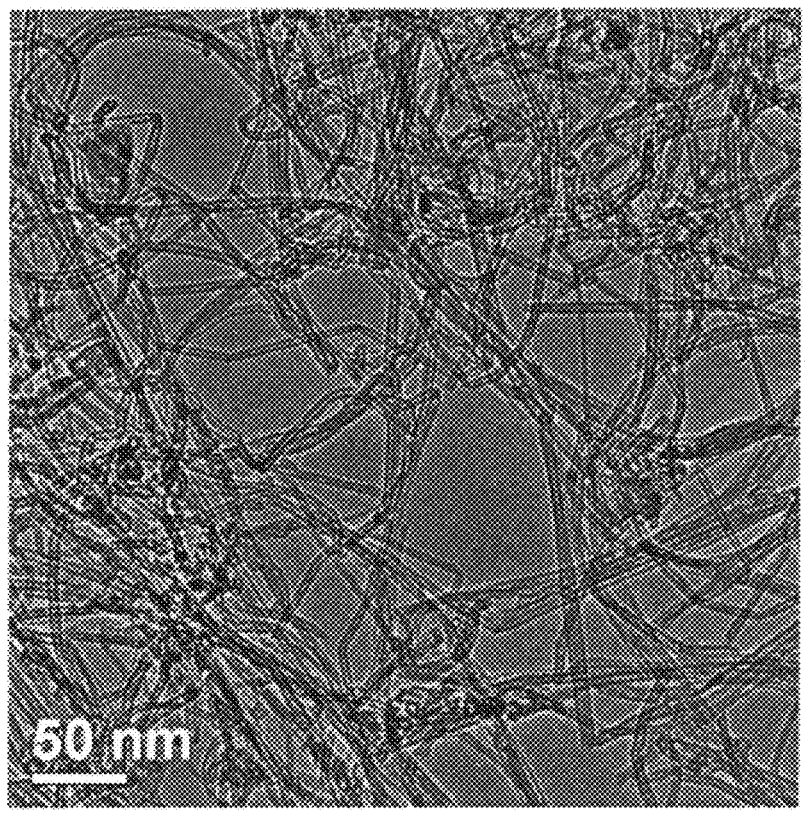
FIG. 2 is a Transmission Electron Microscope (TEM) image of a multi-walled carbon nanotube film, formed by the method of FIG. 1.
Figure 3:
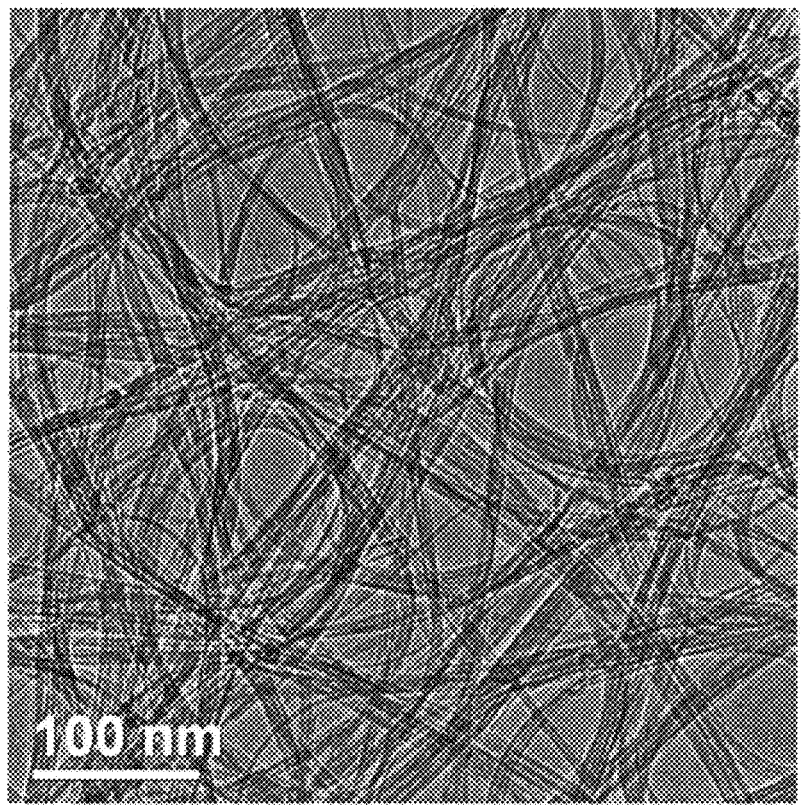
FIG. 3 is a Transmission Electron Microscope (TEM) image of a single-walled carbon nanotube film, formed by the method of FIG. 1.

In step (c), a thickness of the nano-scale film is determined by a concentration of the suspension. Referring to FIG. 2 and FIG. 3, when a mass percentage concentration of the nano-scale particles in the suspension is in the approximate range from 0.1% to 1%, the thickness of the obtained nano-scale film is on the order of tens of nanometers (e.g., 10~50 nm). When a mass percentage concentration of the nano-scale particles in the suspension is in the approximate range from 1% to 10%, the thickness of the obtained nano film is in the approximate range from hundreds of nanometers to several micrometers (e.g., 100 nm~9 μm).

A method for making single walled carbon nanotube film is provided in the first embodiment. It includes the following steps.

Firstly, a plurality of purified single-walled carbon nanotubes is mixed into ethanol to form a suspension. The diameter of the single-walled carbon nanotubes is about 8 nanometers. The length of the single walled carbon nanotubes is on the order of tens of micrometers (e.g., 10~90 μm). The percentage concentration of the single-walled carbon nanotubes in the suspension is about 0.25%, by mass.

Secondly, the suspension is treated by ultrasonic vibration for about 5 minutes to disperse the single-walled carbon nanotubes therein.

Thirdly, the treated suspension is dropped into the ultrapure water. The suspension can be dropped/released into the ultrapure water from the locations above the surface, on the surface, and/or under the surface of the ultrapure water. Specifically, the suspension is sucked by a pipet or a dropping tube. Thereafter, by compressing the pipet or the dropping tube, the suspension is dropped/released into the ultrapure water from the locations above the surface, on the surface, and/or under the surface of the ultrapure water.

Fourthly, the dropped suspension starts an acutely diffusing reaction, a process of which is described in greater detail later. The organic solvent has a good solubility with the ultrapure water. Because the organic solvent in the dropped suspension has the potential to diffuse into the ultrapure water, the dropped suspension starts a quick/rapid diffusion process, no matter at what locations the suspension is dropped. Due to the single-walled carbon nanotubes being saturated with the organic solvent, the organic solvent carries/draws the nano-scale particles to diffuse/move on the surface and/or under the surface of the ultrapure water. Thus, the single-walled carbon nanotubes also starts a process of diffusion. In the process of diffusion, the single-walled carbon nanotubes are not saturated with the ultrapure water, and the organic solvent dissolves with the ultrapure water. Because the ethanol diffuses into the ultrapure water, and the single-walled carbon nanotubes are lighter than the ultrapure water, the single-walled carbon nanotubes lose/separate from the carrier of ethanol and thereby are drawn to float on the surface of the ultrapure water. Due to the single-walled carbon nanotubes being without the carrier of ethanol, not being saturated with the ultrapure water, the surface tension of the ultrapure water, and the density difference, the single carbon nanotubes congregate again and thereby form a single-walled carbon nanotube film on the surface of the ultrapure water. The thickness of the single walled carbon nanotube film is in the range of tens of nanometers. Because the thickness of the single-walled carbon nanotube film is very thin and on the nano-meter scale, the optical transparency properties of the film are very good.

A method for making a carbon black film is provided in the second embodiment. It includes the following steps.

Firstly, an amount of carbon black is mixed into ethanol to form a suspension. The mass percentage concentration of the carbon black in the suspension is about 5%.

Secondly, the suspension is treated by ultrasonic vibration for about 10 minutes to disperse the carbon black therein.

Thirdly, the treated suspension is dropped into the ultrapure water. The suspension can be dropped/released into the ultrapure water from the locations above the surface, on the surface, and under the surface of the ultrapure water. The dropping method is similar to the first embodiment.

Fourthly, the dropped suspension interacts with the ultrapure water in an acutely diffusing reaction, in a manner similar to the first embodiment, thereby uniformly distributing the carbon black in the process. After the diffusion, a carbon black film is formed on the surface of the ultrapure water. The thickness of the carbon black film is in the range of hundreds of nanometers.

It is noted that the nano-scale film can be used in this manner, when the nano-scale film is formed and floats on the surface of the ultrapure water. A substrate, which has been immersed in advance, is withdrawn in a direction perpendicular to the liquid surface to transfer the nano-scale film to the substrate. Moreover, one side of the substrate is withdrawn along one side of the nano-scale film, and thereby the nano-scale film is formed on a surface of the substrate. The nano-scale film is air-dried by allowing such to stand as-is to form the nano-scale film on the surface of the substrate. The substrate is, opportunely, made of glass, silicon, and other materials, which can be chosen according to the practical needs/uses.

Next, the principle of forming a nano-scale film is explained, in detail, by forming the single-walled carbon nanotube film.

Firstly, a plurality of single walled carbon nanotubes is put into ethanol. Due to ethanol being saturated/loaded with the single walled carbon nanotubes, a single-walled carbon nanotube/ethanol suspension/dispersion is formed by ultrasonic vibration treatment. Secondly, the treated single-walled carbon nanotube/ethanol suspension is dropped/released into the ultrapure water. The single-walled carbon nanotubes in the dropped suspension are driven by ethanol to move in the ultrapure water, as per the acutely diffusing reaction mentioned above. In particular, in such an acutely diffusing reaction, the single-walled carbon nanotubes tend to spread around from the dropped locations, driven (i.e., carried) by the diffusion of the ethanol into the ultrapure water. Thirdly, in the process of diffusing, due to the specific gravity (i.e., density) of the single-walled carbon nanotubes being less than that of the ultrapure water, the single-walled carbon nanotubes dropped into the ultrapure water ultimately float on the surface of the ultrapure water, and thereby form a single carbon nanotube film. Fourthly, the treated single-walled carbon nanotube/ethanol suspension is continuously dropped/released into the ultrapure water. As such, the single carbon nanotube film is continuously formed on the ultrapure water. And the forward formed carbon nanotube film with the latter formed carbon nanotube film forms an integral carbon nanotube film. That is, although the treated single-walled carbon nanotube/ethanol suspension has been dropped/released into the ultrapure water with different time, the carbon nanotube film is still an integral film floating on the ultrapure water.

Compared with the conventional methods for making nano-scale films, the methods in the described embodiments employ a surface floating technology associated with liquids to make the nano-scale film including nano-scale particles having the following virtues. Firstly, a change in a concentration of the suspension can be used to control, rather easily, a thickness of the nano-scale film produced. Secondly, the present method can be used to obtain a large area of nano-scale film. Thirdly, the present method is very simple and has a high efficiency potential.

Finally, it is to be understood that the above-described embodiments are intended to illustrate rather than limit the invention. Variations may be made to the embodiments without departing from the spirit of the invention as claimed.

The above-described embodiments illustrate the scope of the invention but do not restrict the scope of the invention.

What is claimed is:

1. A method for making a single-walled carbon nanotube film, comprising the steps of:
   (a) providing a suspension consisting of an organic solvent and a plurality of purified carbon nanotubes dispersed therein, wherein a process for making the suspension comprises the substeps of: directly adding the plurality of purified carbon nanotubes into the organic solvent to form a mixed solution consisting of the plurality of purified carbon nanotubes and the organic solvent; and ultrasonically vibrating the mixed solution;
   (b) releasing the suspension into a liquid having a specific gravity larger than that of the plurality of purified carbon nanotubes, wherein the organic solvent is dissolvable in the liquid; and
   (c) diffusing the plurality of purified carbon nanotubes on a surface of the liquid.

2. The method as claimed in claim 1, wherein the liquid does not infiltrate the plurality of purified carbon nanotubes.

3. The method as claimed in claim 2, wherein the liquid comprises at least one of ultrapure water and a solution of ultrapure water and a salt.

4. The method as claimed in claim 1, wherein the organic solvent comprises at least one substance selected from the group consisting of ethanol, acetone, methanol, isopropanol, and ethyl acetate.

5. The method as claimed in claim 1, wherein a mass percentage concentration of the plurality of purified carbon nanotubes in the suspension is in an approximate range from 0.1% to 10%.

6. The method as claimed in claim 1, wherein the organic solvent is able to infiltrate the nano-scale particles.

7. The method as claimed in claim 1, wherein the liquid does not infiltrate the nano-scale particles.

8. The method as claimed in claim 1, wherein the liquid comprises at least one of ultrapure water and a solution of ultrapure water and a salt.

9. The method as claimed in claim 8, wherein the organic solvent comprises at least one substance selected from the group consisting of ethanol, acetone, methanol, isopropanol, and ethyl acetate.

10. The method as claimed in claim 1, wherein the suspension is released into the liquid from a location under the surface of the liquid.

11. A method for making a single-walled carbon nanotube film, comprising the steps of:
    (a) providing a suspension consisting of an organic solvent and a plurality of purified single-walled carbon nanotubes dispersed therein, wherein a process for making the suspension comprises the substeps of: directly adding the plurality of purified single-walled carbon nanotubes into the organic solvent to form a mixed solution consisting of the plurality of purified carbon nanotubes and the organic solvent; and ultrasonically vibrating the mixed solution;
    (b) releasing the suspension into a liquid having a specific gravity larger than that of the plurality of purified single-walled carbon nanotubes, wherein the organic solvent is dissolvable in the liquid, and the plurality of purified single-walled carbon nanotubes are not dissolved in the liquid; and
    (c) separating the plurality of purified single-walled carbon nanotubes from the organic solvent via the dissolution of the organic solvent in the liquid and the non-dissolution of the plurality of purified single-walled carbon nanotubes in the liquid.

12. The method as claimed in claim 11, wherein the liquid does not infiltrate the plurality of purified carbon nanotubes.

13. The method as claimed in claim 11, wherein the organic solvent is dissolvable in the liquid.

14. The method as claimed in claim 11, wherein the suspension is released into the liquid from a location under the surface of the liquid.

* * * * *